(12) United States Patent
Okuda et al.

(10) Patent No.: US 12,155,041 B2
(45) Date of Patent: Nov. 26, 2024

(54) CYLINDRICAL SECONDARY BATTERY

(71) Applicant: Panasonic Intellectual Property Management Co., Ltd., Osaka (JP)

(72) Inventors: Hiroyuki Okuda, Osaka (JP); Hideharu Takezawa, Nara (JP); Yuko Ogawa, Osaka (JP); Yuki Tokuda, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 710 days.

(21) Appl. No.: 17/282,094

(22) PCT Filed: Sep. 24, 2019

(86) PCT No.: PCT/JP2019/037365
§ 371 (c)(1),
(2) Date: Apr. 1, 2021

(87) PCT Pub. No.: WO2020/084986
PCT Pub. Date: Apr. 30, 2020

(65) Prior Publication Data
US 2021/0376391 A1 Dec. 2, 2021

(30) Foreign Application Priority Data
Oct. 26, 2018 (JP) .................. 2018-202181

(51) Int. Cl.
*H01M 10/0587* (2010.01)
*H01M 4/36* (2006.01)
(Continued)

(52) U.S. Cl.
CPC ....... *H01M 10/0587* (2013.01); *H01M 4/364* (2013.01); *H01M 4/483* (2013.01);
(Continued)

(58) Field of Classification Search
CPC .......... H01M 10/0587; H01M 50/531; H01M 50/534; H01M 50/536; H01M 4/364;
(Continued)

(56) References Cited

U.S. PATENT DOCUMENTS

2003/0186095 A1* 10/2003 Okutani .................. H01M 4/13
429/523
2013/0266834 A1 10/2013 Sawa et al.
(Continued)

FOREIGN PATENT DOCUMENTS

JP  2000-48852 A  2/2000
JP  2006-24464 A  1/2006
(Continued)

OTHER PUBLICATIONS

International Search Report dated Jan. 7, 2020, issued in counterpart International Application No. PCT/JP2019/037365 (2 pages).

*Primary Examiner* — James M Erwin
(74) *Attorney, Agent, or Firm* — WHDA, LLP (57) ABSTRACT

The cylindrical secondary battery is provided with a wound electrode body, a positive electrode tab connected to a positive electrode, a cylindrical case body for housing the electrode body and the positive electrode tab, and a sealing body for sealing an opening of the case body. A negative electrode has, at a winding end of the negative electrode, a negative electrode current collector exposure section where no negative electrode active material layer is disposed, and the negative electrode current collector exposure section is disposed in contact with an inner surface of the case body. The positive electrode tab is disposed at the center in the longitudinal direction of the positive electrode and in a region where the number of layers of the positive electrode in a radial direction is smaller than in other regions in a cross-sectional area of the wound electrode body.

5 Claims, 4 Drawing Sheets

(51) Int. Cl.
*H01M 4/48* (2010.01)
*H01M 4/505* (2010.01)
*H01M 4/525* (2010.01)
*H01M 4/587* (2010.01)
*H01M 50/183* (2021.01)
*H01M 50/531* (2021.01)
*H01M 50/534* (2021.01)
*H01M 50/536* (2021.01)

(52) U.S. Cl.
CPC ........... *H01M 4/505* (2013.01); *H01M 4/525* (2013.01); *H01M 4/587* (2013.01); *H01M 50/183* (2021.01); *H01M 50/531* (2021.01); *H01M 50/534* (2021.01); *H01M 50/536* (2021.01)

(58) Field of Classification Search
CPC ...... H01M 4/483; H01M 4/505; H01M 4/525; H01M 4/587
USPC .......................................................... 429/94
See application file for complete search history.

(56) References Cited

U.S. PATENT DOCUMENTS

| | | | |
|---|---|---|---|
| 2014/0045036 A1* | 2/2014 | Schaefer | H01M 50/574 |
| | | | 429/186 |
| 2014/0141303 A1 | 5/2014 | Matsushita et al. | |
| 2015/0353396 A1 | 12/2015 | Takabatake et al. | |
| 2016/0218368 A1* | 7/2016 | Yamada | H02J 7/007194 |
| 2018/0040881 A1 | 2/2018 | Kusagawa et al. | |
| 2021/0119263 A1* | 4/2021 | Kusagawa | H01M 10/0525 |

FOREIGN PATENT DOCUMENTS

| | | |
|---|---|---|
| JP | 2008-091076 A | 4/2008 |
| JP | 2014-102889 A | 6/2014 |
| JP | 6024754 B2 | 11/2016 |
| WO | 2012/081465 A1 | 6/2012 |
| WO | 2016/147564 A1 | 9/2016 |
| WO | 2017/122251 A1 | 7/2017 |
| WO | 2019/064806 A1 | 4/2019 |

* cited by examiner

CYLINDRICAL SECONDARY BATTERY

TECHNICAL FIELD

The present disclosure relates to a cylindrical secondary battery.

BACKGROUND ART

A conventional cylindrical secondary battery has a structure in which a wound electrode assembly is housed in a cylindrical case body, and an opening of the case body is sealed by a sealing assembly. The wound electrode assembly is formed by winding a positive electrode having a positive electrode active material layer disposed on a positive electrode current collector, a negative electrode having a negative electrode active material layer disposed on a negative electrode current collector, and a separator interposed between the positive electrode and the negative electrode.

Figure 5:
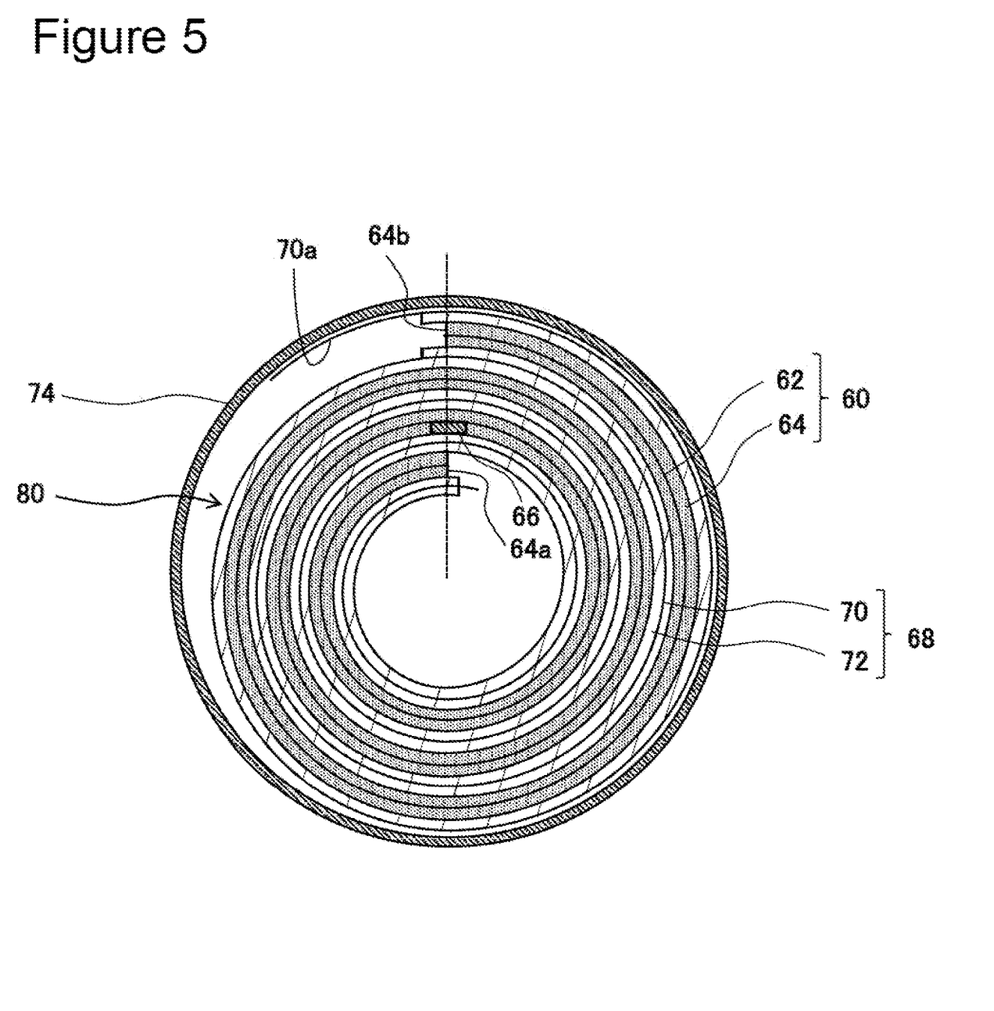
FIG. 5 is a schematic sectional view illustrating an example of a state in which a wound electrode assembly is housed in a case body in a cylindrical secondary battery.

FIG. 5 is a schematic sectional view illustrating an example of a state in which the wound electrode assembly is housed in the case body in the cylindrical secondary battery. A positive electrode active material layer 64 constituting a positive electrode 60 illustrated in FIG. 5 is disposed on both sides of a positive electrode current collector 62. A positive electrode tab 66 is connected to the positive electrode 60. The positive electrode tab 66 overlaps both one end portion 64a of the positive electrode active material layer 64 at the winding start of the positive electrode 60 and the other end portion 64b of the positive electrode active material layer 64 at the winding end of the positive electrode 60 in the radial direction of the winding cross-section of an electrode assembly 80. Note that the positive electrode tab 66 extends from the positive electrode 60 and is connected to a positive electrode terminal (not illustrated) provided in the secondary battery. A negative electrode active material layer 72 constituting a negative electrode 68 illustrated in FIG. 5 is disposed on both sides of a negative electrode current collector 70. The winding end of the negative electrode 68 is provided with an exposed portion 70a of the negative electrode current collector, in which the negative electrode active material layer 72 is not formed on the negative electrode current collector 70, and the exposed portion 70a of the negative electrode current collector is in contact with the inner surface of a case body 74. That is, the case body 74 serves as a negative electrode terminal.

CITATION LIST

Patent Literature

PATENT LITERATURE 1: Japanese Unexamined Patent Application Publication No. 2006-24464
PATENT LITERATURE 2: Japanese Patent No. 6024754

SUMMARY

In the secondary battery, the negative electrode active material layer expands during charge, and accordingly, the stress of the electrode assembly increases. In particular, in the wound electrode assembly constituting the cylindrical secondary battery, the stress remarkably increases in the vicinity of the positive electrode tab. In the cylindrical secondary battery employing the battery structure in which the exposed portion of the negative electrode current collector formed at the winding end of the negative electrode is in contact with the inner surface of the case body, a remarkable increase in the stress of the wound electrode assembly may lead to deterioration in charge-discharge cycle characteristic.

Therefore, it is an advantage of the present disclosure to prevent deterioration in charge-discharge cycle characteristic in a cylindrical secondary battery comprising a wound electrode assembly and having a battery structure in which an exposed portion of a negative electrode current collector formed at the winding end of a negative electrode is in contact with the inner surface of a case body.

A cylindrical secondary battery according to an aspect of the present disclosure comprises: a wound electrode assembly formed by winding a positive electrode in which a positive electrode active material layer is disposed on a positive electrode current collector, a negative electrode in which a negative electrode active material layer is disposed on a negative electrode current collector, and a separator interposed between the positive electrode and the negative electrode; a positive electrode tab connected to the positive electrode; a cylindrical case body that houses the electrode assembly and the positive electrode tab; and a sealing assembly that seals an opening of the case body. The negative electrode has, at a winding end of the negative electrode, an exposed portion of a negative electrode current collector in which no negative electrode active material layer is disposed, and the exposed portion of the negative electrode current collector is disposed in contact with an inner surface of the case body. The electrode assembly has a region A where the number of layers of the positive electrode in a radial direction is smaller than in another region in a region on a winding cross-section of the electrode assembly. The positive electrode tab is disposed at a longitudinal center of the positive electrode and disposed in the region A where the number of layers of the positive electrode in the radial direction is smaller than in the other region in the region of the winding cross-section of the electrode assembly.

According to the present disclosure, it is possible to prevent deterioration in charge-discharge cycle characteristic in the cylindrical secondary battery comprising the wound electrode assembly and having the battery structure in which the exposed portion of the negative electrode current collector formed at the winding end of the negative electrode is in contact with the inner surface of the case body.

DESCRIPTION OF EMBODIMENTS

An example of a cylindrical secondary battery which is an aspect of the present disclosure will be described below. The drawings to be referred to in the following description of an embodiment are schematically described, and dimensional ratios of components drawn in the drawings may be different from those of actual components.

Figure 1:
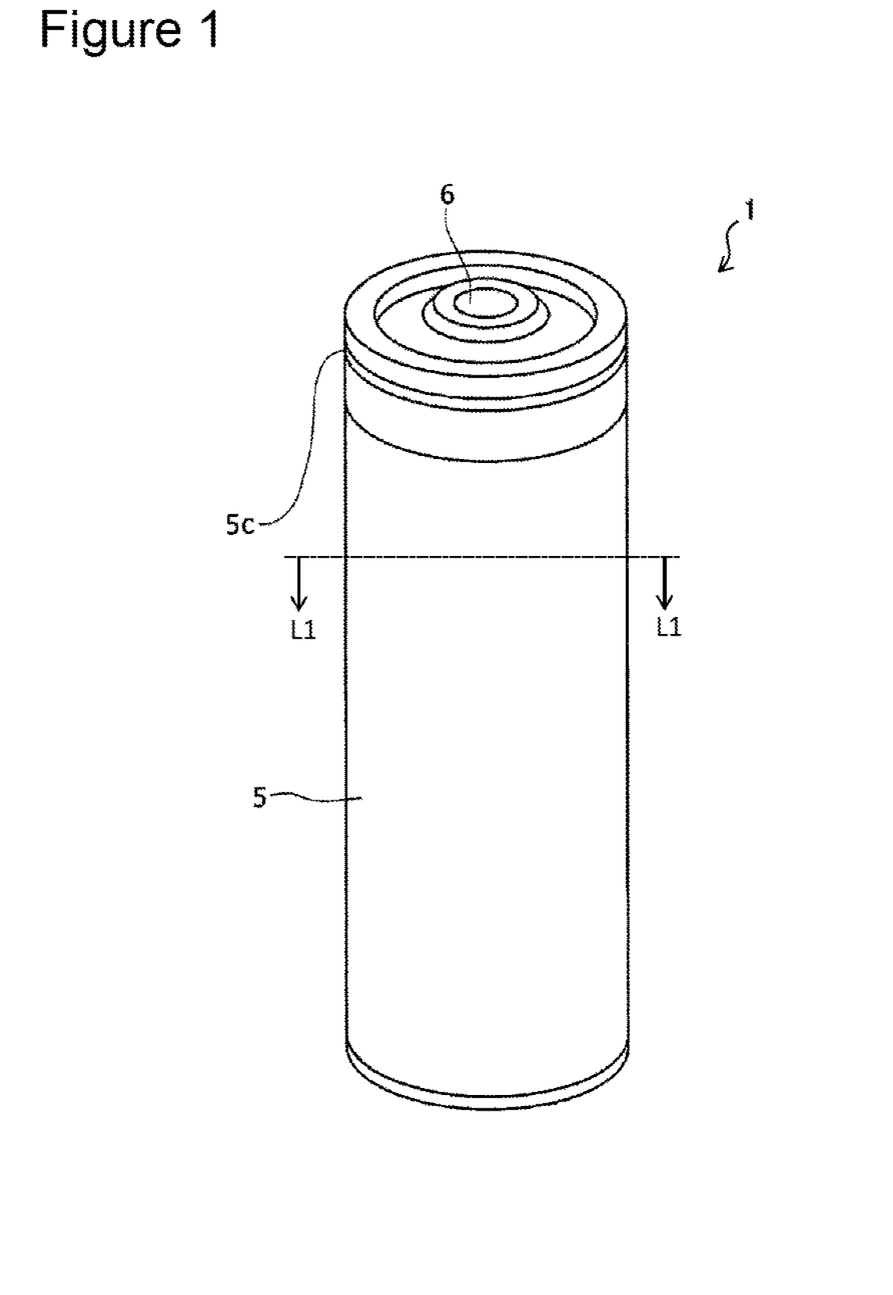
FIG. 1 is a perspective view illustrating an external appearance of a cylindrical secondary battery according to an embodiment.
Figure 2:
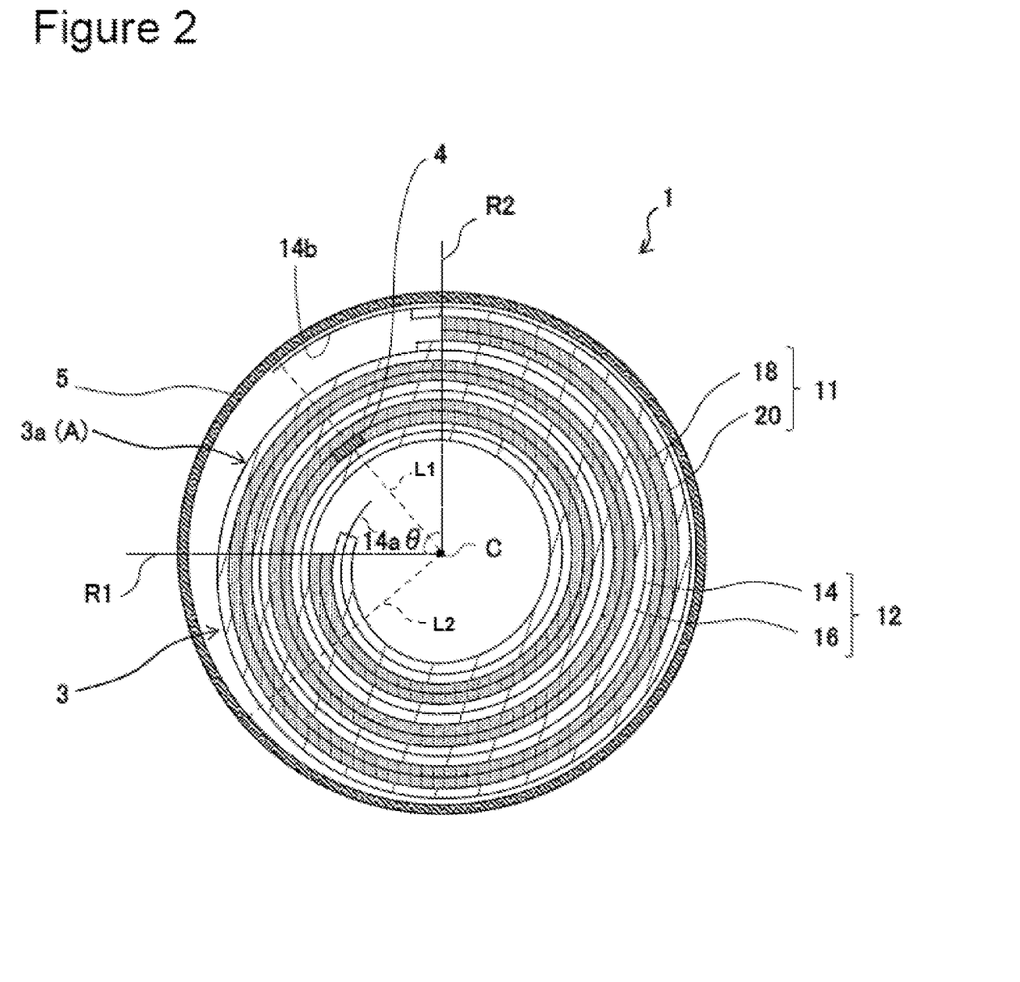
FIG. 2 is a sectional view taken along line L1-L1 in FIG. 1.

FIG. 1 is a perspective view illustrating an external appearance of a cylindrical secondary battery according to the embodiment. FIG. 2 is a sectional view taken along line L1-L1 in FIG. 1. A cylindrical secondary battery 1 according to the present embodiment comprises an electrode assembly 3, an electrolyte, a positive electrode tab 4, a case body 5, and a sealing assembly 6. The electrode assembly 3 comprises a positive electrode 11, a negative electrode 12, and a separator.

The case body 5 houses the electrode assembly 3, the electrolyte, the positive electrode tab 4, and the like, and has a bottomed cylindrical shape having an opening, for example. As illustrated in FIG. 1, a groove 5c recessed inward along the circumferential direction is formed in the upper portion of the case body 5. In a portion where the groove 5c is formed, the inner surface of the case body 5 protrudes, and the sealing assembly 6 is supported by the protrusion to seal the opening of the case body 5. A gasket is desirably provided between the case body 5 and the sealing assembly 6.

The electrode assembly 3 according to the present embodiment is a wound electrode assembly formed by winding the positive electrode 11, the negative electrode 12, and the separator interposed between the positive electrode 11 and the negative electrode 12. In FIG. 2, the separator constituting the electrode assembly 3 is not illustrated.

Figure 3:
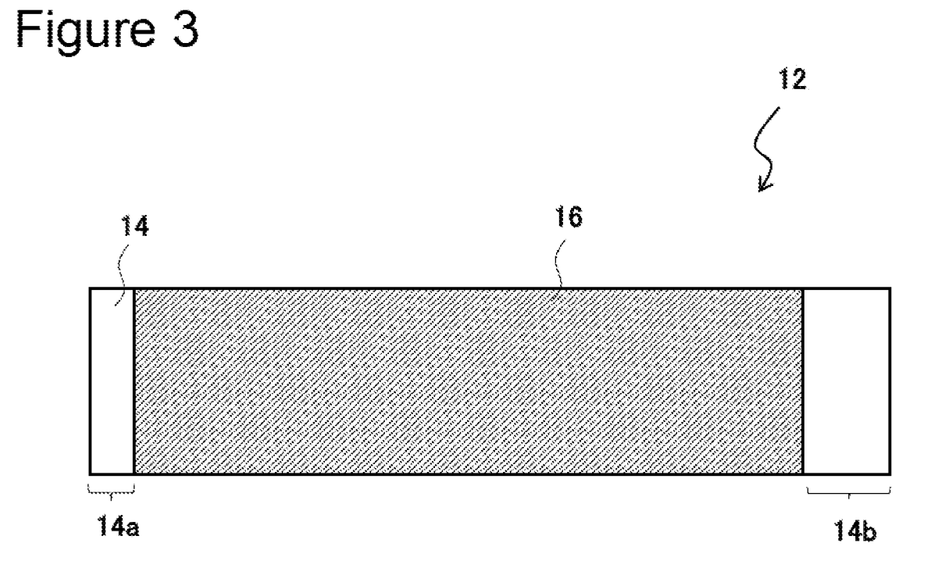
FIG. 3 is a schematic plan view illustrating a negative electrode in a state before winding.

FIG. 3 is a schematic plan view illustrating the negative electrode in a state before winding. In FIG. 3, the longitudinal left end portion of the negative electrode 12 is the winding start of the negative electrode 12 at the time of forming the wound electrode assembly 3 and becomes an inner peripheral portion of the electrode assembly 3. The longitudinal right end portion of the negative electrode 12 is the winding end of the negative electrode 12 at the time of forming the wound electrode assembly 3 and becomes an outer peripheral portion of the electrode assembly 3.

As illustrated in FIGS. 2 and 3, the negative electrode 12 comprises a negative electrode current collector 14 and a negative electrode active material layer 16 disposed on the negative electrode current collector 14. As illustrated in FIG. 2, the negative electrode active material layer 16 is desirably disposed on both sides of the negative electrode current collector 14.

The negative electrode 12 has exposed portions 14a, 14b of the negative electrode current collector, in which the negative electrode active material layer 16 is not disposed on the negative electrode current collector 14, and the negative electrode current collector 14 is exposed. The exposed portion 14a of the negative electrode collector illustrated in FIG. 3 is disposed at the winding start of the negative electrode 12, and is positioned on the inner peripheral side of the electrode assembly 3 when the electrode assembly 3 is formed, as illustrated in FIG. 2. Further, the exposed portion 14b of the negative electrode current collector illustrated in FIG. 3 is disposed at the winding end of the negative electrode 12, and is positioned at the outermost periphery of the electrode assembly 3 when the electrode assembly 3 is formed, as illustrated in FIG. 2. Then, as illustrated in FIG. 2, the exposed portion 14b of the negative electrode current collector positioned on the outermost periphery of the electrode assembly 3 comes into contact with the inner surface of the case body 5. Thereby, the case body 5 becomes a negative electrode terminal. In the present embodiment, of the exposed portions 14a, 14b of the negative electrode current collector, the negative electrode 12 need only have at least the exposed portion 14b of the negative electrode current collector, which is disposed at the winding end of the negative electrode 12. The length of the exposed portion 14b of the negative electrode current collector is not particularly limited, but is desirably a length one or more times around the outer periphery of the electrode assembly 3, for example, in order to obtain a good contact state with the case body 5. In the present embodiment, the battery has the structure in which the exposed portion 14b of the negative electrode current collector is in contact with the inner surface of the case body 5, but in addition to this structure, the battery may have a structure in which the negative electrode tab has one end connected to the negative electrode 12 and the other end connected to the case body 5 (e.g., the bottom).

Figure 4:
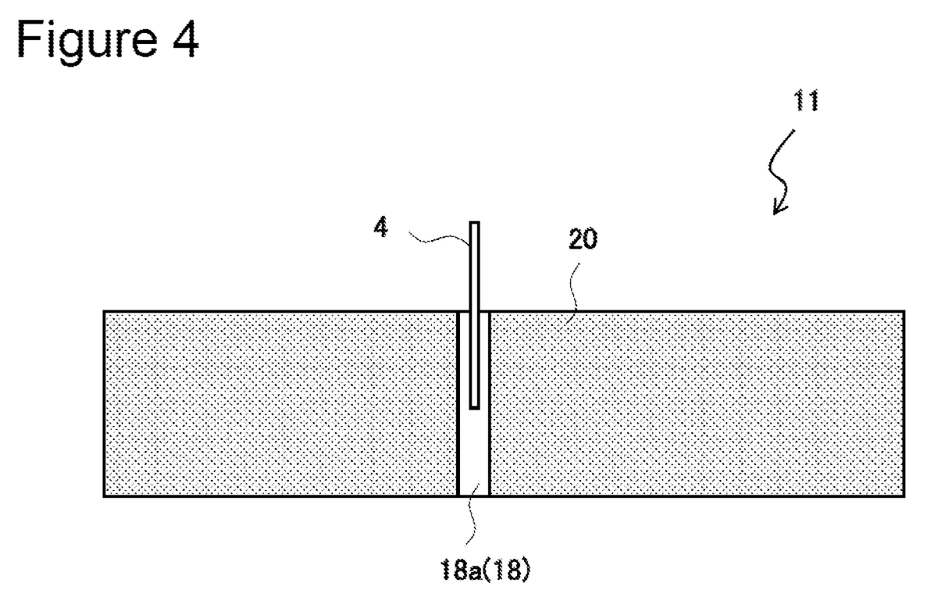
FIG. 4 is a schematic plan view illustrating a positive electrode in the state before winding.

FIG. 4 is a schematic plan view illustrating the positive electrode in the state before winding. In FIG. 4, the longitudinal left end portion of the positive electrode 11 is the winding start of the positive electrode 11 at the time of forming the wound electrode assembly 3 and becomes the inner peripheral portion of the electrode assembly 3. The longitudinal right end portion of the positive electrode 11 is the winding end of the positive electrode 11 at the time of forming the wound electrode assembly 3 and becomes the outer peripheral portion of the electrode assembly 3.

As illustrated in FIGS. 2 and 4, the positive electrode 11 comprises a positive electrode current collector 18 and a positive electrode active material layer 20 disposed on the positive electrode current collector 18. As illustrated in FIG. 2, the positive electrode active material layer 20 is desirably disposed on both sides of the positive electrode current collector 18.

The positive electrode 11 has an exposed portion 18a of the positive electrode current collector, in which the positive electrode active material layer 20 is not disposed on the positive electrode current collector 18, and the positive electrode current collector 18 is exposed. The exposed portion 18a of the positive electrode current collector illustrated in FIG. 4 is disposed at the longitudinal center of the positive electrode 11. Here, the longitudinal center of the positive electrode 11 is a region ranging from one-third to two-thirds of the longitudinal length of the positive electrode 11 when the longitudinal length is divided into three equal parts.

The positive electrode tab 4 is connected to the exposed portion 18a of the positive electrode current collector, which is disposed at the longitudinal center of the positive electrode 11. The positive electrode tab 4 extends from the positive electrode 11 and is connected to the lower surface of the sealing assembly 6. Thereby, the sealing assembly 6 becomes a positive electrode terminal.

Further, as illustrated in FIG. 2, the positive electrode tab 4 is disposed in a region 3a where the number of layers of the positive electrode 11 in the radial direction of the electrode assembly 3 is smaller than in the other region in the region of the winding cross-section of the electrode assembly 3. Here, the number of layers of the positive electrode 11 in the radial direction of the electrode assembly 3 is the number of layers in a state where the positive electrode active material layer 20 is disposed on the positive electrode current collector 18, and any layers of the positive electrode current collector 18 on which the positive electrode active material layer 20 is not disposed which are layered in the radial direction of the electrode assembly 3 are not included in the number of layers of the positive electrode 11. Hence the number of layers of the positive electrode 11 in the region 3a illustrated in FIG. 2 is two, and the number of layers of the positive electrode 11 in the other region is three. By designing the positive electrode 11 such that one end portion of the positive electrode active material layer 20 at the winding start of the positive electrode 11 and the other end portion of the positive electrode active material layer 20 at the winding end of the positive electrode 11 do not overlap in the radial direction of the winding cross-section of the electrode assembly 3, it is possible to form the region 3*a* where the number of layers of the positive electrode 11 in the radial direction of the electrode assembly 3 is smaller than in the other region in the region of the winding cross-section of the electrode assembly 3.

As described above, in the cylindrical secondary battery, the stress of the electrode assembly increases in accordance with the expansion of the negative electrode active material layer during charge. In particular, the stress remarkably increases in the vicinity of the positive electrode tab. However, as in the present embodiment, the positive electrode tab 4 is disposed at the longitudinal center of the positive electrode 11 and disposed in the region 3*a* where the number of layers of the positive electrode 11 in the radial direction of the electrode assembly 3 is smaller than in the other region in the region of the winding cross-section of the electrode assembly 3, whereby the increase in stress in the vicinity of the positive electrode tabs 4 is reduced as compared to a case in which the positive electrode tab 4 is disposed in the other region where the number of layers of the positive electrode 11 in the radial direction of the electrode assembly 3 is larger than in the region 3*a*. Further, the increase in stress in the vicinity of the positive electrode tab 66 is reduced as compared to a case where, as illustrated in FIG. 5, the positive electrode tab 66 is disposed so as to overlap one end portion 64*a* of the positive electrode active material layer 64 at the winding start of the positive electrode 60 and the other end portion 64*b* of the positive electrode active material layer 64 at the winding end of the positive electrode 60 in the radial direction of the winding cross-section of the electrode assembly 80. As a result, according to the cylindrical secondary battery of the present embodiment, deterioration in charge-discharge cycle characteristic is prevented.

When the width of the region 3*a* in the circumferential direction of the electrode assembly 3 is excessively large, the amount of the positive electrode active material layer 20 decreases, so that the energy density of the secondary battery may decrease, and when the width of the region 3*a* in the circumferential direction of the electrode assembly 3 is excessively small, the stress of the electrode assembly 3 during charge may increase. Therefore, in the present embodiment, as illustrated in FIG. 2, an angle θ formed by a straight line R1 connecting one end of the region 3*a* and a winding center C of the positive electrode 11 and a straight line R2 connecting the other end of the region 3*a* and the winding center C of the positive electrode 11 is preferably in the range of 10° to 120°, and more preferably in the range of 30° to 90°. By setting the angle θ to the above range, the width of the region 3*a* in the circumferential direction of the electrode assembly 3 is set in an appropriate range, thereby reducing the decrease in the energy density of the secondary battery and reducing the increase in the stress of the electrode assembly 3 during charge.

The ratio of the diameter (L1) of the electrode assembly 3 to the inner diameter (L2) of the case body 5 (L1/L2) is preferably in the range of 0.95 to 1.05, and more preferably in the range of 0.97 to 1.03. Note that the diameter (L1) of the electrode assembly 3 is the maximum diameter of the electrode assembly 3. When L1/L2 satisfies the above range, the energy density of the secondary battery becomes high as compared to a case where L1/L2 is less than 0.97, and the increase in the stress of the electrode assembly 3 during charge is reduced as compared to a case where L1/L2 is more than 1.03.

The roundness in the winding cross-section of the electrode assembly 3 is preferably 0.98 or more. When the roundness of the electrode assembly 3 satisfies the above range, the increase in the stress of the electrode assembly 3 during charge is reduced as compared to a case where the roundness of the electrode assembly 3 is less than 0.98. Although the roundness of the electrode assembly 3 greatly depends on the position of the positive electrode tab 4, as in the present embodiment, the positive electrode tab 4 is disposed in the region 3*a* where the number of layers of the positive electrode 11 in the radial direction of the electrode assembly 3 is smaller than in the other region in the region of the winding cross-section of the electrode assembly 3, so that the roundness in the winding cross-section of the electrode assembly 3 can be set to 0.98 or more. The roundness in the winding cross-section of the electrode assembly 3 is measured by the minimum diameter of the electrode assembly cross-section and the maximum diameter of the electrode assembly cross-section.

Although the cylindrical secondary battery of the present embodiment is not particularly limited to a lithium-ion secondary battery, an alkaline secondary battery, or the like, in the following, a lithium-ion secondary battery will be taken as an example to describe in detail the positive electrode 11, the negative electrode 12, the electrolyte, and the separator used in the lithium-ion secondary battery.

As the positive electrode current collector 18 constituting the positive electrode 11, for example, a foil of a metal, such as aluminum, stable in the potential range of the positive electrode, a film with the metal disposed on the surface layer, or the like is used.

The positive electrode active material layer 20 constituting the positive electrode 11 includes a positive electrode active material. The positive electrode active material layer 20 preferably includes a conductive agent and a binder in addition to the positive electrode active material.

Examples of the positive electrode active material include lithium transition metal composite oxides, such as lithium cobalt oxide, lithium manganate, lithium nickelate, lithium nickel-manganese composite oxide, and lithium nickel-cobalt composite oxide. In order to increase the capacity of the secondary battery, the positive electrode active material layer preferably includes a composite oxide including Ni, Co, Li, and at least one of Mn and Al, and the content of Ni in the composite oxide is preferably at least 91 mol % relative to a total number of moles of metal elements in the composite oxide excluding Li. Note that the composite oxide may include elements such as Ti, Zr, Nb, B, W, Mg, Mo, and Fe.

Examples of the conductive agent include carbon powder such as carbon black, acetylene black, Ketchen black, and graphite. These may be used alone or in a combination of two or more.

Examples of the binder include a fluorine-based polymer and a rubber-based polymer. Examples of the fluorine-based polymer include polytetrafluoroethylene (PTFE), polyvinylidene fluoride (PVdF), or modified products thereof, and examples of the rubber-based polymer include ethylene-propylene-isoprene copolymer and ethylene-propylene-butadiene copolymer. These may be used alone or in a combination of two or more.

The material of the positive electrode tab 4 is not particularly limited, and may be a metal such as aluminum or titanium.

As the negative electrode current collector 14 constituting the negative electrode 12, for example, a foil of a metal, such as copper, stable in the potential range of the negative electrode, a film with the metal disposed on the surface layer, or the like is used.

The negative electrode active material layer 16 constituting the negative electrode 12 includes, for example, a negative electrode active material. The negative electrode active material layer 16 preferably includes a thickener and a binder in addition to the negative electrode active material.

The negative electrode active material is not particularly limited as long as being a material capable of absorbing and desorbing lithium ions, and for example, a carbon material such as graphite, non-graphitizable carbon, graphitizable carbon, fibrous carbon, coke, or carbon black, a metal such as Si or Sn which is alloyed with Li, a metal compound including Si and Sn, a lithium titanium composite oxide, or the like may be used. In order to increase the capacity of the secondary battery, the negative electrode active material preferably includes, for example, graphite and a Si compound, and the ratio of the Si compound to the total mass of the negative electrode active material is preferably 5.5 mass % or more. Examples of the Si compound include $SiO_x$ ($0.5 \le x \le 1.6$).

As the binder, PTFE or the like can be used as in the case of the positive electrode, but a styrene-butadiene copolymer (SBR) or a modified product thereof may be used. As the thickener, carboxymethyl cellulose (CMC) or the like can be used.

The electrolyte includes a non-aqueous solvent and an electrolyte salt dissolved in the non-aqueous solvent. Examples of the non-aqueous solvent include esters, ethers, nitriles, amides such as dimethylformamide, isocyanates such as hexamethylene diisocyanate, and mixed solvents of two or more of these. The non-aqueous solvent may contain a halogen substitute obtained by substituting at least a part of hydrogen of the solvent with halogen atoms such as fluorine.

Examples of the above esters include: cyclic carbonate esters such as ethylene carbonate (EC), propylene carbonate (PC), and butylene carbonate; chain carbonate esters such as dimethyl carbonate (DMC), ethyl methyl carbonate (EMC), diethyl carbonate (DEC), methyl propyl carbonate, ethyl propyl carbonate, and methyl isopropyl carbonate; cyclic carboxylic acid esters such as γ-butyrolactone and γ-valeroladtone; and chain carboxylic acid esters such as methyl acetate, ethyl acetate, propyl acetate, methyl propionate (MP), and ethyl propionate.

Examples of the above ethers include: cyclic ethers such as 1,3-dioxolane, 4-methyl-1,3-dioxolane, tetrahydrofuran, 2-methyltetrahydrofuran, propylene oxide, 1,2-butylene oxide, 1,3-dioxane, 1,4-dioxane, 1,3,5-trioxane, furan, 2-methylfuran, 1,8-cineol, and crown ether; and chain ethers such as 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxytoluene, benzyl ethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether, and tetraethylene glycol dimethyl.

Examples of the nitriles include acetonitrile, propionitrile, butyronitrile, valeronitrile, n-heptanitrile, succinonitrile, glutaronitrile, adibonitrile, pimelonitrile, 1,2,3-propanetricarbonitrile, and 1,3,5-pentanetricarbonitrile.

Examples of the halogen substitute include fluorinated cyclic carbonate esters such as fluoroethylene carbonate (FEC), fluorinated chain carbonate esters, and fluorinated chain carboxylic acid esters such as methyl fluoropropionate (FMP).

Examples of electrolyte salts include: borate salts such as $LiBF_4$, $LiClO_4$, $LiPF_6$, $LiAsF_6$, $LiSbF_6$, $LiAlCl_4$, $LiSCN$, $LiCF_3SO_3$, $LiCF_3CO_2$, $Li(P(C_2O_4)F_4)$, $LiPF_{6-x}(CnF_{2n+1})_x$ ($1<x<6$, n is 1 or 2), $LiB_{10}Cl_{10}$, LiCl, LiBr, LiI, chloroborane lithium; lower aliphatic carboxylic acid lithium, $Li_2B_4O_7$, and $Li(B(C_2O_4)F_2)$; and imides such as $LiN(SO_2CF_3)_2$, $LiN(C_lF_{2l+1}SO_2)(C_mF_{2m+1}SO_2)$ (l and m are integers equal to or larger than 0). These electrolyte salts may be used alone or as a mixture of a plurality of them. The concentration of the electrolyte salt is, for example, from 0.8 to 1.8 mol per litter of the non-aqueous solvent.

As the separator, for example, a porous sheet having ion permeability and insulating properties, or the like, is used. Specific examples of the porous sheet include a microporous thin film, a woven fabric, and a non-woven fabric. The material of the separator is preferably olefin resins such as polyethylene and polypropylene, cellulose, and the like. The separator may be a laminate having a cellulose fiber layer and a thermoplastic resin fiber layer such as an olefin resin. The separator may be a multilayer separator including a polyethylene layer and a polypropylene layer, and the surface of the separator may be coated with a material such as an aramid resin or ceramic.

EXAMPLES

The present disclosure will be further described below with reference to examples, but the present disclosure is not limited to these examples.

Example 1

[Preparation of Positive Electrode]

A positive electrode mixture shiny was prepared by mixing 100 parts by mass of $LiNi_{0.91}Co_{0.045}Al_{0.045}O_2$, which is a positive electrode active material, 1.0 parts by mass of acetylene black (conductive agent), 0.9 parts by mass of polyvinylidene fluoride (binder), and an appropriate amount of NMP. The obtained positive electrode mixture slurry was applied to both sides of an aluminum foil having a thickness of 20 μm, which becomes a positive electrode current collector, and was dried and rolled to prepare a strip-shaped positive electrode. However, an exposed portion of the positive electrode current collector was provided at the longitudinal center of the positive electrode. A positive electrode tab was welded onto the exposed portion of the positive electrode current collector.

[Preparation of Negative Electrode]

A mixture of graphite and Si compound (mass ratio 94.5:5.5), which is a negative electrode active material, was prepared. SiO was used as the Si compound. A negative electrode mixture slurry was prepared by mixing 100 parts by mass of the mixture, 1 part by mass of styrene-butadiene rubber (binder), 1 part by mass of carboxymethyl cellulose (thickener), and water. The obtained negative electrode mixture shiny was uniformly applied to both sides of a copper foil having a thickness of 8 μm, which becomes a negative electrode current collector, and was dried and rolled to prepare a belt-shaped negative electrode. However, an exposed portion of the negative electrode current collector was provided on both sides of the end portion on the winding end side of the negative electrode.

[Preparation of Non-Aqueous Electrolyte]

A non-aqueous electrolyte was prepared by dissolving LiPF$_6$ at a concentration of 1.4 mol/L in a mixed solvent (volume ratio 1:1:8) of ethylene carbonate, ethyl methyl carbonate, and dimethyl carbonate.

[Preparation of Cylindrical Secondary Battery]

A positive electrode and a negative electrode were layered with a separator interposed therebetween and were wound to form a wound electrode assembly. At this time, the exposed portion of the negative electrode current collector was disposed in the outermost peripheral portion of the electrode assembly, and the positive electrode tab was disposed in a region where the number of layers of the positive electrode in the radial direction was smaller than the other region (hereinafter referred to as a region having a smaller number of layers) in the region of the winding cross-section of the electrode assembly.

An insulating plate was disposed at the top and bottom of the electrode assembly, and the electrode assembly was housed into an iron case body with its inner surface nickel-plated. The positive electrode tab protruding from the electrode assembly was welded to the inner surface of the sealing assembly having a gasket at the peripheral edge. After the non-aqueous electrolyte was injected into the case body, the opening of the case body was closed with the sealing assembly, and the opening end of the case body was caulked to the peripheral edge of the sealing assembly through a gasket, thereby preparing a cylindrical secondary battery. The winding cross-section of the electrode assembly was observed by X-ray computed tomography (CT) analysis, and it was confirmed that the exposed portion of the negative electrode current collector positioned in the outermost peripheral portion of the electrode assembly was in contact with the inner surface of the case body. The angle formed by the straight line R1 connecting one end of the region having a smaller number of layers and the winding center C of the positive electrode and the straight line R2 connecting the other end of the region having a smaller number of layers and the winding center C of the positive electrode was 100°. Note that the angles formed by the straight lines R1 and R2 and the straight line connecting the positive electrode tab disposed in the region having a smaller number of layers and the winding center of the positive electrode were 60° and 40°, respectively. The ratio of the diameter L1 of the electrode assembly to the inner diameter L2 of the case body (L1/L2) was 0.993.

Example 2

A cylindrical secondary battery was prepared in the same manner as in Example 1 except that the angle θ formed by the straight line R1 connecting one end of the region having a smaller number of layers and the winding center C of the positive electrode and the straight line R2 connecting the other end of the region having a smaller number of layers and the winding center C of the positive electrode was set to 210°, and the angles θ formed by the straight lines R1 and R2 and the straight line connecting the positive electrode tab disposed in the region having a smaller number of layers and the winding center of the positive electrode were set to 170° and 40°, respectively. The ratio of the diameter L1 of the electrode assembly to the inner diameter L2 of the case body (L1/L2) was 0.995.

Example 3

A cylindrical secondary battery was prepared in the same manner as in Example 1 except that no Si compound was used as the negative electrode active material. The ratio of the diameter L1 of the electrode assembly to the inner diameter L2 of the case body (L1/L2) was 0.994.

Example 4

A cylindrical secondary battery was prepared in the same manner as in Example 2 except that no Si compound was used as the negative electrode active material. The ratio of the diameter L1 of the electrode assembly to the inner diameter L2 of the case body (L1/L2) was 0.995.

Example 5

A cylindrical secondary battery was prepared in the same manner as in Example 1 except that LiNi$_{0.88}$Co$_{0.09}$Al$_{0.03}$O$_2$ was used as the positive electrode active material. The ratio of the diameter L1 of the electrode assembly to the inner diameter L2 of the case body (L1/L2) was 0.992.

Example 6

A cylindrical secondary battery was prepared in the same manner as in Example 2 except that LiNi$_{0.88}$Co$_{0.09}$Al$_{0.03}$O$_2$ was used as the positive electrode active material. The ratio of the diameter L1 of the electrode assembly to the inner diameter L2 of the case body (L1/L2) was 0.994.

Example 7

A cylindrical secondary battery was prepared in the same manner as in Example 1 except that no Si compound was used as the negative electrode active material, and LiNi$_{0.88}$Co$_{0.09}$Al$_{0.03}$O$_2$ was used as the positive electrode active material. The ratio of the diameter L1 of the electrode assembly to the inner diameter L2 of the case body (L1/L2) was 0.993.

Example 8

A cylindrical secondary battery was prepared in the same manner as in Example 2 except that no Si compound was used as the negative electrode active material, and LiNi$_{0.88}$Co$_{0.09}$Al$_{0.03}$O$_2$ was used as the positive electrode active material. The ratio of the diameter L1 of the electrode assembly to the inner diameter L2 of the case body (L1/L2) was 0.994.

Comparative Example 1

A cylindrical secondary battery was prepared in the same manner as in Example 1 except that the positive electrode tab was disposed so as to overlap both one end portion of the positive electrode active material layer at the winding start of the positive electrode and the other end portion of the positive electrode active material layer at the winding end of the positive electrode in the radial direction of the winding cross-section of the electrode assembly 80, as illustrated in FIG. 5. The ratio of the diameter L1 of the electrode assembly to the inner diameter L2 of the case body (L1/L2) was 0.996.

Comparative Example 2

A cylindrical secondary battery was prepared in the same manner as in Comparative Example 1 except that no Si compound was used as the negative electrode active material. The ratio of the diameter L1 of the electrode assembly to the inner diameter L2 of the case body (L1/L2) was 0.994.

Comparative Example 3

A cylindrical secondary battery was prepared in the same manner as in Comparative Example 1 except that $LiNi_{0.88}Co_{0.09}Al_{0.03}O_2$ was used as the positive electrode active material. The ratio of the diameter L1 of the electrode assembly to the inner diameter L2 of the case body (L1/L2) was 0.995.

Comparative Example 4

A cylindrical secondary battery was prepared in the same manner as in Comparative Example 1 except that no Si compound was used as the negative electrode active material, and $LiNi_{0.88}Co_{0.09}Al_{0.03}O_2$ was used as the positive electrode active material. The ratio of the diameter L1 of the electrode assembly to the inner diameter L2 of the case body (L1/L2) was 0.995.

[Cycle Characteristic]

In the prepared cylindrical secondary battery, the charge-discharge cycle in the following charge-discharge conditions was repeated at a temperature of 25° C. 300 times.

[Charge-Discharge Conditions]

The constant current charge was performed at a current of 1.0 It (800 mA) until the battery voltage became 4.2 V, and then the constant voltage charge was performed at a voltage of 4.2 V until the current value became 0.05 It (40 mA). After a pause for 10 minutes, the constant current discharge was performed at a current of 1.0 It (800 mA) until the battery voltage became 2.75 V.

[Capacity Retention in 300th Cycle]

The discharge capacity in the first cycle and the discharge capacity in the 300th cycle in the above charge-discharge conditions were measured, and the capacity retention in the 300th cycle was obtained by the following formula. Table 1 shows the results.

Capacity retention in 300th cycle (%)=(Discharge capacity in 300th cycle/Discharge capacity in first cycle)×100

TABLE 1

| | Region having smaller number of layers | | | Ratio of Ni in positive electrode active material (mol %) | Ratio of Si compound in negative electrode active material (mass %) | Capacity retention in 300th cycle (%) |
|---|---|---|---|---|---|---|
| | Positive electrode tab was disposed in region having smaller number of layers | Angle formed by R1 and R2 | L1/L2 | | | |
| Example 1 | ○ | 100° | 0.993 | 91 | 5.5 | 75.8 |
| Example 2 | ○ | 210° | 0.995 | 91 | 5.5 | 72.1 |
| Example 3 | ○ | 100° | 0.994 | 91 | 0 | 72.4 |
| Example 4 | ○ | 210° | 0.995 | 91 | 0 | 71.3 |
| Example 5 | ○ | 100° | 0.992 | 88 | 5.5 | 72.3 |
| Example 6 | ○ | 210° | 0.994 | 88 | 5.5 | 70.9 |
| Example 7 | ○ | 100° | 0.993 | 88 | 0 | 70.1 |
| Example 8 | ○ | 210° | 0.994 | 88 | 0 | 69.8 |
| Comparative Example 1 | X | — | 0.996 | 91 | 5.5 | 70.2 |
| Comparative Example 2 | X | — | 0.994 | 91 | 0 | 70.3 |
| Comparative Example 3 | X | — | 0.995 | 88 | 5.5 | 70.2 |
| Comparative Example 4 | X | — | 0.995 | 88 | 0 | 69.6 |

Comparing the examples with the comparative example in which the same positive electrode active material and the same negative electrode active material were used, the capacity rate in the 300th cycles was high, and the deterioration in charge-discharge cycle characteristic was prevented in Examples 1 and 2 as compared to Comparative Example 1, in Examples 3 and 4 as compared to Comparative Example 2, in Examples 5 and 6 as compared to Comparative Example 3, and in Examples 7 and 8 as compared to Comparative Example 4.

REFERENCE SIGNS LIST 1 cylindrical secondary battery
3, 80 electrode assembly
3a region
4, 66 positive electrode tab
5, 74 case body
5c groove
6 sealing assembly
11, 60 positive electrode
12, 68 negative electrode
14, 70 negative electrode current collector
14a, 14b, 70a exposed portion of negative electrode current collector
16, 72 negative electrode active material layer
18, 62 positive electrode current collector
18a exposed portion of positive electrode current collector
20, 64 positive electrode active material layer
64a one end portion
64b other end portion
80 electrode assembly

The invention claimed is:

1. A cylindrical secondary battery comprising:
a wound electrode assembly formed by winding a positive electrode having a positive electrode active material layer disposed on a positive electrode current collector, a negative electrode having a negative electrode active material layer disposed on a negative electrode current collector, and a separator interposed between the positive electrode and the negative electrode;
a positive electrode tab connected to the positive electrode;
a cylindrical case body that houses the electrode assembly and the positive electrode tab; and
a sealing assembly that seals an opening of the case body, wherein
the negative electrode has, at a winding end of the negative electrode, an exposed portion of the negative electrode current collector in which no negative electrode active material layer is disposed, and the exposed portion of the negative electrode current collector is disposed in direct physical contact with an inner surface of the case body,
the electrode assembly has a region A in which the number of layers of the positive electrode in a radial direction is smaller than in another region in a region on a winding cross-section of the electrode assembly,
the positive electrode tab is disposed at a longitudinal center of the positive electrode and disposed in the region A in which the number of layers of the positive electrode in the radial direction is smaller than in the other region in the region of the winding cross-section of the electrode assembly, and
an angle formed by a straight line connecting one end of the region A and a winding center of the positive electrode and a straight line connecting the other end of the region A and the winding center of the positive electrode is in a range of 10° to 100°.

2. The cylindrical secondary battery according to claim 1, wherein a ratio of a diameter L1 of the electrode assembly to an inner diameter L2 of the case body (L1/L2) is in a range of 0.97 to 1.03.

3. The cylindrical secondary battery according to claim 1, wherein a roundness in the winding cross-section of the electrode assembly is 0.98 or more.

4. The cylindrical secondary battery according to claim 1, wherein
the positive electrode active material layer includes a composite oxide including Ni, Co, Li, and at least one of Mn and Al, and
a content of the Ni in the composite oxide is at least 91 mol % relative to a total number of moles of metal elements in the composite oxide excluding Li.

5. The cylindrical secondary battery according to claim 1, wherein
the negative electrode active material layer includes a negative electrode active material including graphite and a Si compound, and
a ratio of the Si compound to a total mass of the negative electrode active material is 5.5 mass % or more.

* * * * *